Nov. 3, 1959    A. WENGER    2,911,304
METHOD OF PRINTING DESIGNS ON CONFECTIONS
Filed July 11, 1955
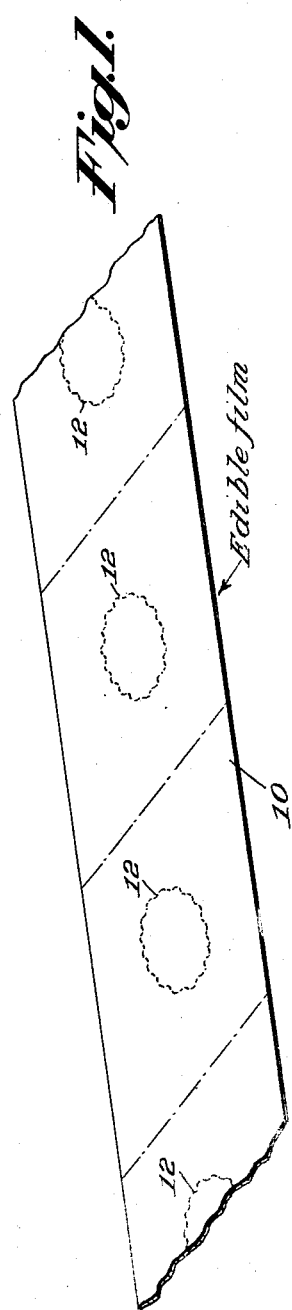
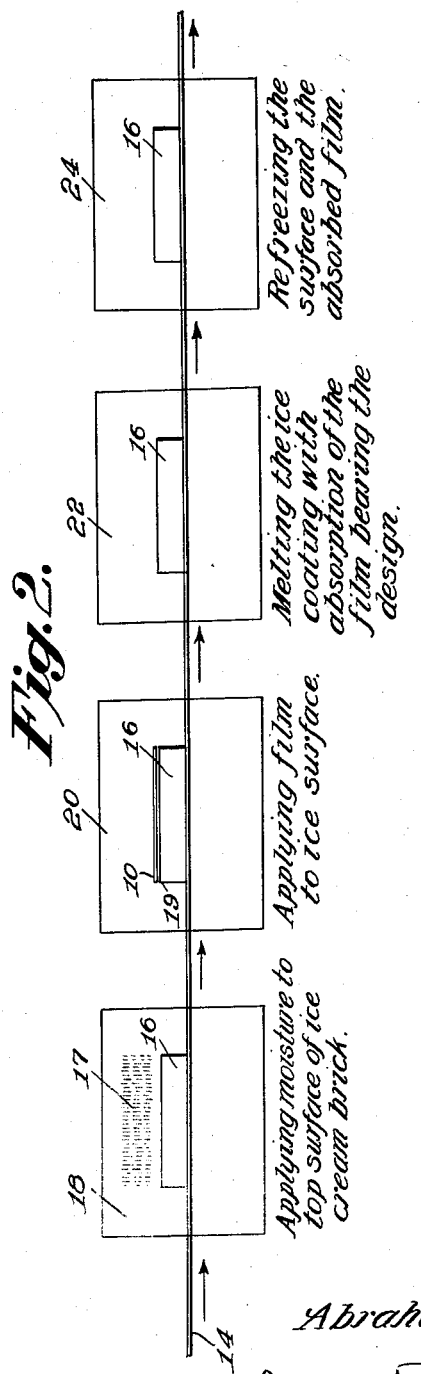
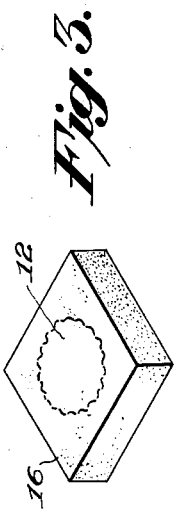
INVENTOR
Abraham Wenger
BY
ATTORNEY 2,911,304
Patented Nov. 3, 1959

2,911,304

METHOD OF PRINTING DESIGNS ON CONFECTIONS

Abraham Wenger, Richmond, Va., assignor to Candy Crafts, Incorporated, Richmond, Va., a corporation of Virginia Application July 11, 1955, Serial No. 521,024

5 Claims. (Cl. 99—137)

This invention relates to the decoration of food stuffs and more particularly to a method of applying edible designs to confections.

An object of this invention is the production of designs such as pictures, mottoes, greetings, etc. on confections of various sorts, and particularly on ice cream by direct printing with a silk screen or stencil, and indirectly by first printing such designs on a film and applying the film to the confection.

Another object of this invention is to provide for stencil printing on confections which have a substantially flat surface of sufficient area to carry a suitable design, picture, motto or greeting.

A particular object of this invention is to apply edible designs to ice cream bricks. Such designs may be cartoons, pictures, greetings, mottoes or other designs and may be applied directly to ice cream bricks by means of a silk screen stencil as stated in my co-pending application Serial No. 487,256, filed February 10, 1955, of which this is a continuation-in-part; but I prefer to directly print the designs etc. on a sheet or film of non-toxic edible material, as disclosed in my co-pending application above mentioned, and suitably divide the imprinted film into appropriate portions and apply such portions to the surface of an ice cream brick.

An additional object of this invention is to provide means for transferring a printed design to the surface of an ice cream brick by means of a soluble film to leave the design in its original configuration on the ice cream.

Still another object of this invention is the production of designs on ice cream from a film having the design printed thereon, wherein the film may be amalgamated with the surface of the ice cream leaving the design in its original form.

A still further object of this invention is to provide a frozen moisture coating on the surface of an ice cream brick to which a film soluble at low temperatures is applied having a design thereon which will be deposited intact on the ice cream by melting the coating to dissolve the film leaving the design intact.

Yet another object of this invention is the provision of a soluble film carrying a printed design thereon in which the solubility of the film at low temperatures is greater than that of the printed material.

Other objects may appear on considering the following specification and the accompanying drawings forming a part thereof.

In the drawings:

Fig. 1 represents a portion of my edible film having repeat designs printed thereon;

Fig. 2 is a block diagram of the steps of my novel method, and

Fig. 3 is a representation of an ice cream brick having a design applied thereto.

The same characters of reference represent like elements throughout the drawing and attention is now directed to Fig. 1, wherein a sheet or film 10 of edible material such as methyl cellulose having the desired properties of being produced as a thin tenacious film and also of being soluble at low temperatures, such as those near the freezing point of water, has printed thereon desired designs 12 by suitable means, preferably by a silk screen stencil. This preferred method of printing desired designs on such film is fully disclosed in my co-pending application, above referred to.

A roll of such material may be printed with a large number of repeat designs.

A conveyor system 14 may carry bricks 16 of ice cream through the several steps of my process starting with station 18 representing a step of applying a small amount of moisture 17 to the surface of the ice cream brick 16. The moisture may be sprayed, brushed or otherwise applied to the ice cream brick to form a very thin layer or coating on the surface of the brick. As the ice cream at this stage is very cold, the moisture almost immediately becomes a layer or coating of ice 19 on the surface of the ice cream brick. The thus coated ice cream brick passes next to stage 20 where a portion of the film 10 containing the desired design or picture is severed from a strip thereof and applied to the frozen coated surface of the ice cream.

At the next stage, 22, the frozen coating 19 on the ice cream brick 16 is allowed to melt or sufficient heat may be applied thereto to melt the coating 19. This causes the film 10 to dissolve and to be absorbed into the surface of the ice cream by a blending of the melted coating 19 and the ice cream leaving the design or picture carried by the film intact on the surface of the brick 16 as shown in Fig. 3. The ice cream brick 16 with the desired design or picture thereon next passes to stage 24 where it is cooled to the desired storage temperature and then passed to the conventional wrapping and packaging machines or stages.

While I have referred herein to the use of a film such as methyl cellulose as a carrier for the designs, it is to be understood that other suitable films may be used.

This invention depends not so much on the particular material used as it does on the use of an edible material as a film transfer means for a design or picture and particularly to one which may be applied to a confection as ice cream bricks or cakes, and to become amalgamated with the surface thereof to leave a design thereon.

I have mentioned that the designs are printed on the confections or on the film by means of a silk screen stencil process. In this process I use edible coloring mixtures containing acceptable food dyes or coloring matter of the kind ordinarily used in decorating confections. Such mixtures while fluent and do contain moisture they are of such consistancy that they will not dissolve in the amount of moisture present and necessary for dissolving the film. Such mixtures may be made in the manner of cake icings or by mixing food colorings with gelatin, sugar and a small amount of water. Such mixtures will set rapidly and the products or confections to which they are applied can be handled soon after printing. Some mixtures, especially those for direct stencil printing on ice cream may contain a small amount of cocoa butter. Such mixtures must be of a consistency which can easily be worked through the screen and leave an appreciable quantity on the confection.

While I have described a preferred form of my invention this description is not to be considered a limitation, but modifications may be made within the skill of the art as comprehended by the appended claims.

I claim:

1. The method of decorating food stuffs by placing a desired design thereon comprising forming the desired design from edible material and applying such design to a film of edible material which is more soluble than the edible material forming the design, placing the relatively soluble film having the relatively insoluble design thereon onto the food stuffs, and then causing the film to be dissolved and absorbed into the food stuffs leaving the design intact on a surface thereof, the edible film being methyl cellulose.

2. The method as recited in claim 1 wherein said food stuffs is ice cream.

3. The method of decorating ice cream by placing a desired design thereon comprising forming the desired design from edible material and applying the design to a film of methyl cellulose which will dissolve at relatively low temperature, placing the methyl cellulose film having the design thereon onto the ice cream, causing the film to dissolve and be absorbed into the ice cream leaving the design intact thereon.

4. The method of decorating ice cream by placing a desired design thereon comprising forming the desired design from edible material and applying the design to a film of methyl cellulose which is more soluble than the edible material forming the design, causing a moisture coating to be formed on a surface of the ice cream, placing the methyl cellulose film having the design thereon onto the moisture coated surface, causing the film to dissolve and be absorbed into the ice cream leaving the design intact on the surface thereof.

5. The method of decorating ice cream by placing a desired design thereon comprising forming the desired design from edible material and applying the design, by a silk screen process, to a thin tenacious non-toxic transparent film of methyl cellulose which will dissolve at near freezing temperature, applying a moisture coating to the surface of the ice cream, freezing the coating, placing the methyl cellulose film onto the ice coating, thawing the ice coating to dissolve the methyl cellulose film and amalgamate the film into the ice cream leaving the design intact thereon and then refreezing the decorated ice cream.

References Cited in the file of this patent

UNITED STATES PATENTS

| | | |
|---|---|---|
| 1,627,630 | Carter | May 10, 1927 |
| 1,890,044 | Policastro et al. | Dec. 6, 1932 |
| 2,648,165 | Nestor | Aug. 11, 1953 |

OTHER REFERENCES

Haynes: "Cellulose: The Chemical That Grows," 1953, publ. by Doubleday & Co. (New York), p. 314½.

"Bakers Helper," vol. 93, No. 1169, May 13, 1950, pp. 67 to 70.

"Water-Soluble Cellulose Ethers," by Bock, Industrial and Engineering Chemistry, vol 29, No. 9, September 1937, pp. 985–987.